（12) United States Patent
Dorenbosch

(10) Patent No.: US 6,757,548 B1
(45) Date of Patent: Jun. 29, 2004

(54) METHOD AND APPARATUS IN A WIRELESS MESSAGING SYSTEM FOR ESTIMATING AND USING REQUIRED DELIVERY PARAMETERS TO MEET A TARGET TRANSMISSION RELIABILITY

(75) Inventor: Jheroen Pieter Dorenbosch, Paradise, TX (US)

(73) Assignee: Motorola, Inc., Schaumburg, IL (US)

( * ) Notice: Subject to any disclaimer, the term of this patent is extended or adjusted under 35 U.S.C. 154(b) by 531 days.

(21) Appl. No.: 09/144,414

(22) Filed: Aug. 31, 1998

(51) Int. Cl.[7] .............................................. H04Q 7/20
(52) U.S. Cl. ..................................... 455/517; 340/7.22
(58) Field of Search ............................... 455/31.1, 31.2, 455/426, 503, 517; 348/825.44; 709/233; 340/7.22, 7.21, 7.23, 7.25

(56) References Cited

U.S. PATENT DOCUMENTS

| | | | |
|---|---|---|---|
| 4,771,391 A | * | 9/1988 | Blasberg .................... 364/514 |
| 5,315,635 A | | 5/1994 | Kane et al. |
| 5,396,537 A | | 3/1995 | Schwendeman |
| 5,841,764 A | * | 11/1998 | Roderique et al. .......... 370/310 |
| 5,862,171 A | * | 1/1999 | Mahaney .................... 375/200 |
| 5,912,878 A | * | 6/1999 | Park et al. .................. 370/229 |

FOREIGN PATENT DOCUMENTS

WO WO 00/13433 A2 * 3/2000 ............ H04Q/7/20

* cited by examiner

*Primary Examiner*—Charles Appiah
(74) *Attorney, Agent, or Firm*—Romi L. Bose

(57) ABSTRACT

A controller (112) monitors (306) delivery of two-way outbound messages to a plurality of portable messaging units (122), and records (308) reliability statistics (238) for the two-way outbound messages as a function of delivery parameters. The controller also determines (316) a target transmission reliability for sending a message; and estimates (318), from the reliability statistics, the required delivery parameters for sending the message at the target transmission reliability. The controller then transmits (320) the message in accordance with the required delivery parameters.

10 Claims, 3 Drawing Sheets

METHOD AND APPARATUS IN A WIRELESS MESSAGING SYSTEM FOR ESTIMATING AND USING REQUIRED DELIVERY PARAMETERS TO MEET A TARGET TRANSMISSION RELIABILITY

FIELD OF THE INVENTION

This invention relates in general to wireless communication systems, and more specifically to a method and apparatus in a wireless messaging system for estimating and using required delivery parameters to meet a target transmission reliability.

BACKGROUND OF THE INVENTION

Information services messages (IS) are becoming increasingly important in wireless messaging systems. Such messages add to the attractiveness of wireless messaging and may become a major source of revenue. Users who pay for IS messages will expect reasonable reliability of delivery.

A potential problem with the delivery reliability is created by virtue of the fact that IS messages are normally sent as one-way group-call messages, which typically are received simultaneously by a large number of messaging units. The large number of messaging units makes an individual acknowledgment from each unit impracticable, even when the unit has two-way transmission capability. The lack of an acknowledgment makes it impossible to be certain that an IS message has been delivered reliably to all intended recipients.

Delivery reliability can vary widely among zones and subzones of a messaging system. Many two-way systems are configured for reliable two-way delivery and can retry an outbound message in response to a missing or negative acknowledgment. One-way delivery in such systems can be somewhat compromised. This implies that one-way IS message fragments may have to be repeated. A prior art technique has been to use a static controller configuration which sets a maximum fragment size and a minimum repeat count for IS messages. That technique is course, because it does not take into account the varying message lengths, varying transmission rates, varying reliability of zones and subzones, different reliability requirements for different messages, and the variation of reliability with time.

Thus, what is needed is a method and apparatus in a wireless messaging system that can provide an automated technique for taking these variations and differences into account in order to achieve a specified message delivery reliability. Preferably, the method and apparatus will achieve its objective with a minimum of overhead.

SUMMARY OF THE INVENTION

An aspect of the present invention is a method in a wireless messaging system for estimating and using required delivery parameters to meet a target transmission reliability. The method comprises the steps of monitoring delivery of two-way outbound messages to a plurality of portable messaging units, and recording reliability statistics for the two-way outbound messages as a function of delivery parameters. The method further comprises the steps of determining the target transmission reliability for sending a message; and estimating, from the reliability statistics, the required delivery parameters for sending the message at the target transmission reliability. The method also includes the step of transmitting the message in accordance with the required delivery parameters.

Another aspect of the present invention is a controller in a wireless messaging system for estimating and using required delivery parameters to meet a target transmission reliability. The controller comprises a network interface for receiving a message for transmission, and a processing system coupled to the network interface for processing the message. The controller further comprises a base station interface coupled to the processing system for controlling a base station to transmit the message. The processing system is programmed to monitor delivery of two-way outbound messages to a plurality of portable messaging units, and to record reliability statistics for the two-way outbound messages as a function of delivery parameters. The processing system is further programmed to determine the target transmission reliability for sending the message; and to estimate, from the reliability statistics, the required delivery parameters for sending the message at the target transmission reliability. The processing system is also programmed to transmit the message in accordance with the required delivery parameters.

DETAILED DESCRIPTION OF THE DRAWINGS

Figure 1:
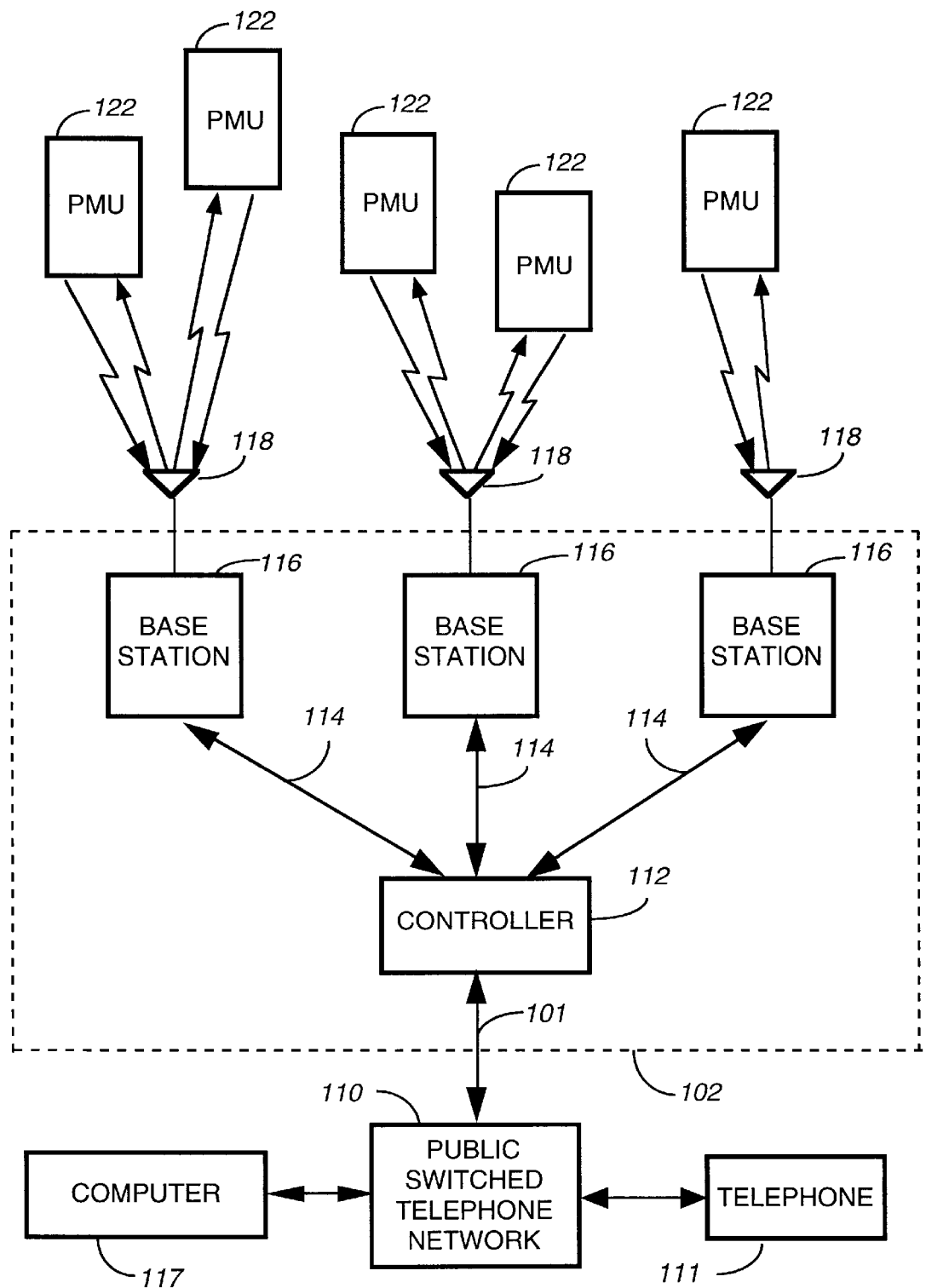
FIG. 1 is an electrical block diagram of an exemplary wireless messaging system in accordance with the present invention.

Referring to FIG. 1, an electrical block diagram depicts an exemplary wireless messaging system in accordance with the present invention comprising an infrastructure portion 102 including a controller 112 and a plurality of conventional base stations 116, the communication system also including a plurality of conventional portable messaging units (PMUs) 122. The base stations 116 preferably communicate with the PMUs 122 utilizing conventional radio frequency (RF) techniques, and are coupled by conventional communication links 114 to the controller 112, which controls the base stations 116.

The hardware of the controller 112 is preferably a combination of the Wireless Messaging Gateway (WMG™) Administrator! paging terminal, and the RF-Conductor!™ message distributor manufactured by Motorola, Inc. The software of the controller 112 is modified in accordance with the present invention, as described further below. The hardware of the base stations 116 is preferably a combination of the RF-Orchestra! transmitter and RF-Audience!™ receivers manufactured by Motorola, Inc. The PMUs 122 are preferably similar to PageWriter™ 2000 data messaging units, also manufactured by Motorola, Inc. It will be appreciated that other similar hardware can be utilized as well for the controller 112, the base stations 116, and the PMUs 122.

Each of the base stations 116 transmits RF signals to the PMUs 122 via an antenna 118. The base stations 116 preferably each receive RF signals from the plurality of PMUs 122 via the antenna 118. The RF signals transmitted by the base stations 116 to the PMUs 122 (outbound messages) comprise selective call addresses identifying the PMUs 122, and data messages originated by a caller, as well as commands originated by the controller 112 for adjusting operating parameters of the radio communication system. The RF signals preferably transmitted by the PMUs 122 to the base stations 116 (inbound messages) comprise responses that include scheduled messages, such as positive acknowledgments (ACKs) and negative acknowledgments (NAKs), and unscheduled messages, such as registration requests. It will be appreciated that a portion of the PMUs in the wireless messaging system of FIG. 1 can be one-way-only devices.

The controller 112 preferably is coupled by telephone links 101 to a public switched telephone network (PSTN) 110 for receiving selective call message originations therefrom. Selective call originations comprising data messages from the PSTN 110 can be generated, for example, from a conventional telephone 111 or a conventional computer 117, e.g., for generating information services (IS) messages, coupled to the PSTN 110. The over-the-air protocol utilized for outbound and inbound messages is preferably selected from Motorola's well-known FLEX™ family of digital selective call signaling protocols. These protocols utilize well-known error detection and error correction techniques and are therefore tolerant to bit errors occurring during transmission, provided that the bit errors are not too numerous. It will be appreciated that other suitable protocols can be used as well.

Figure 2:
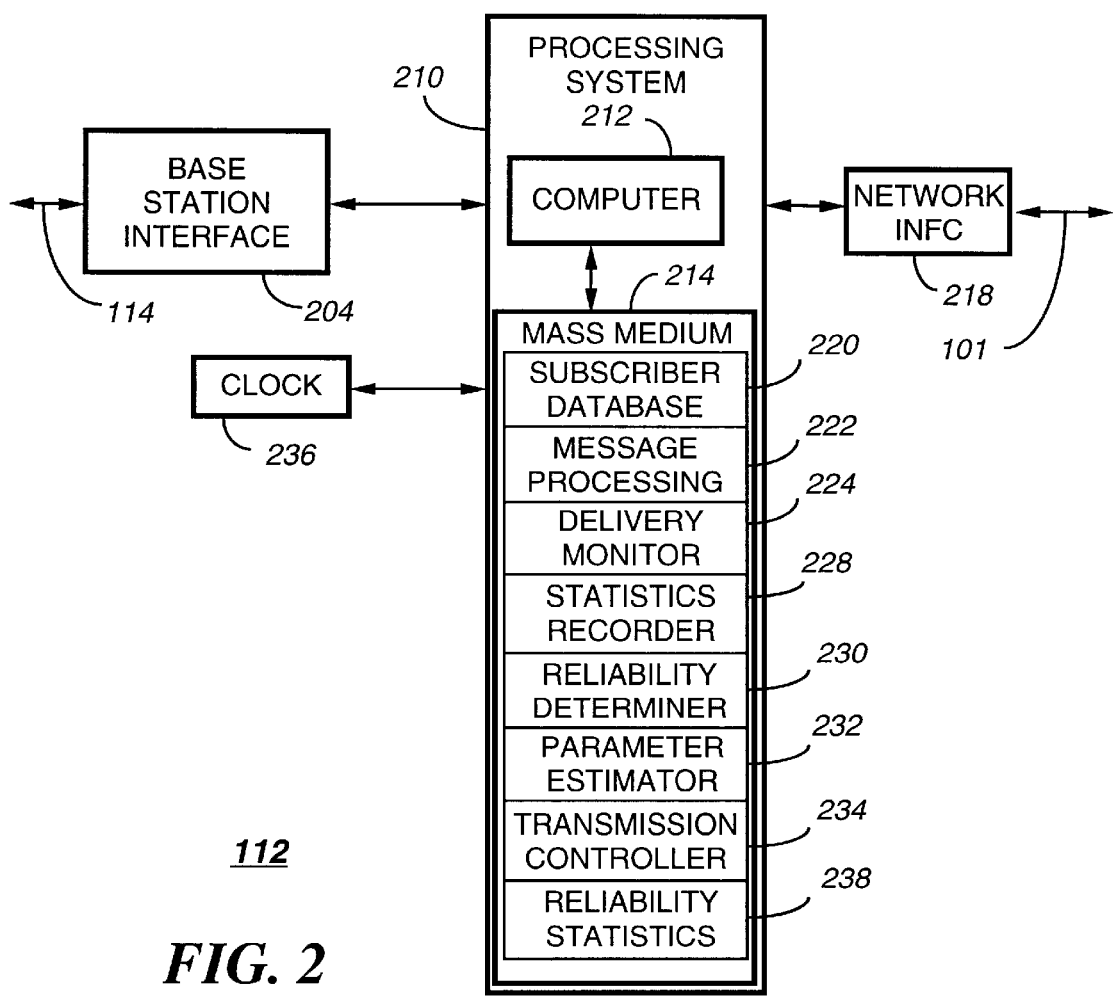
FIG. 2 is an electrical block diagram of an exemplary controller in accordance with the present invention.

FIG. 2 is an electrical block diagram depicting an exemplary controller 112 in accordance with the present invention. The controller 112 comprises a network interface 218 for receiving a message from a message originator via the telephone links 101. The network interface 218 is coupled to a processing system 210 for controlling and communicating with the network interface 218. The processing system is coupled to a base station interface 204 for controlling and communicating with the base stations 116 via the communication links 114. It will be appreciated that additional controllers (not shown) can be utilized between the controller 112 and the base stations 116. The processing system 210 is also coupled to a conventional clock 236 for providing a timing signal to the processing system 210. The processing system 210 comprises a conventional computer 212 and a conventional mass medium 214, e.g., a magnetic disk drive, programmed with information and operating software in accordance with the present invention. The mass medium 214 comprises a conventional subscriber database 220 for storing profiles defining service for subscribers using the system. The mass medium 214 further comprises a message processing element 222 for processing messages through well-known techniques.

The mass medium 214 also includes a delivery monitor program 224 for programming the processing system 210 to monitor the delivery of two-way outbound messages to the PMUs 122. In addition, the mass medium 214 includes a statistics recorder program 228 for programming the processing system to record reliability statistics 238 for the two-way outbound messages as a function of delivery parameters. The mass medium 214 further comprises a reliability determiner program 230 for programming the processing system 210 to determine the target transmission reliability for sending a message. The mass medium 214 also includes a parameter estimator program 232 for programming the processing system 210 to estimate, from the reliability statistics, the required delivery parameters for sending the message at the target transmission reliability. In addition, the mass medium 214 includes a transmission controller program 234 for programming the processing system 210 to transmit the message in accordance with the required delivery parameters. The mass medium 214 also includes a space for storing the reliability statistics 238 recorded by the processing system 210. Operation of the controller 112 is described in greater detail herein below.

Figure 3:
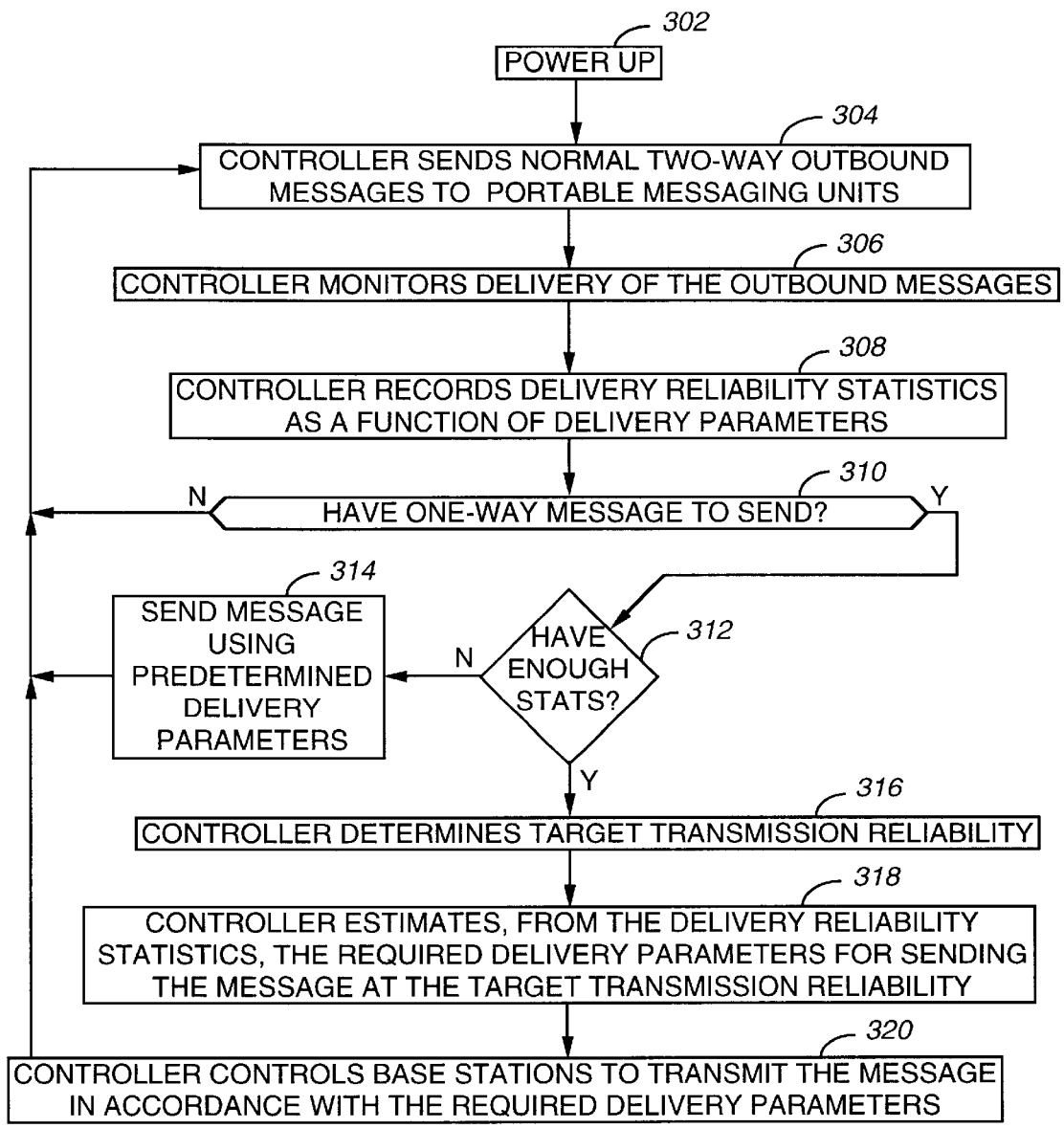
FIG. 3 is a flow diagram depicting operation of the exemplary controller in accordance with the present invention.

FIG. 3 is a flow diagram 300 depicting operation of the exemplary controller 112 in accordance with the present invention. After the controller 112 is first powered up 302, it begins sending 304 normal two-way outbound messages to the portable messaging units (PMUs) 122. The controller 112 then cooperates with the base stations 116 to monitor 306 the delivery of the two-way outbound messages. This is easily accomplished, because a two-way message, when received correctly, will generate an acknowledgment (ACK) response from the PMU. When received incorrectly, the two-way message will generate a negative acknowledgment (NAK) response. When not received at all, e.g., when the PMU is out of range or inoperative, the two-way message will generate no response.

The controller 112 then records 308 the delivery reliability statistics 238 as a function of predetermined delivery parameters. For example, the controller 112 preferably records for each message sent, whether the response is an ACK, NAK, or no response, along with the delivery parameters used in sending the message. The delivery parameters can include, for example, the message fragment size, the transmission rate in bits per second, and, when transmitting in multiple geographic coverage areas, the geographic coverage area to which the message was sent. The controller 112 preferably builds the delivery reliability statistics 238 over a period of time sufficient to ensure acceptable statistical accuracy, as determined through well-known techniques. When sufficient statistics have been collected, the controller 112 then preferably calculates therefrom and records the probability that a message fragment is correctly delivered in a single delivery attempt, as a function of at least one of fragment size, transmission rate, and geographic coverage area. The probability preferably is computed as the fraction of the two-way message fragments received correctly for each unique combination of delivery parameters.

Preferably in computing and recording the probability that a message fragment is correctly delivered in a single delivery attempt, the controller 112 estimates, from a predetermined subset of the reliability statistics, a fraction of the plurality of PMUs which cannot receive any messages; and adjusts the reliability statistics in accordance with the fraction. This can be accomplished easily, for example, by considering only a subset of the reliability statistics, the subset being associated with messages for which a response is received, i.e., the probability that a message fragment is correctly delivered in a single delivery attempt is equal to the number of ACKs divided by the total number of responses:

$$P = ACKs/(ACKs + NAKs).$$

By performing the probability calculation in this manner, nonresponding PMUs will not affect the result.

The controller 112 then checks 310 whether it has a one-way message, such as an IS message, to send. If not, the controller 112 returns to step 304 and continues sending two-way messages and building the delivery reliability statistics 238. If, on the other hand, at step 310 the controller 112 does have a one-way message in queue to be sent, then the controller 112 checks whether sufficient delivery reliability statistics 238 have been collected and recorded to provide a predetermined statistical accuracy. If not, the controller sends 314 the one-way message using a predetermined set of delivery parameters. If, on the other hand, at step 312 the controller 112 determines that sufficient statistics have been collected, then the controller 112 determines 316 the target transmission reliability. Transmission reliability is defined herein as the mean probability of correctly receiving the message by each of the population of PMUs that are powered up and within the geographic coverage area to which the message is being sent. In a large group call, the transmission reliability can be used to estimate the fraction of the population of PMUs that are powered up and within the geographic coverage area to which the message is being sent, that will correctly receive the message.

Preferably, the target transmission reliability is determined from a target reliability indicator contained in the one-way message through well-known techniques, so that the message originator can control the target transmission reliability. Alternatively, the target transmission reliability can be determined from a predetermined rule, e.g., all messages sent to a group-call IS address are to have a target transmission reliability of 0.98.

Next, the controller 112 estimates 318, from the delivery reliability statistics 238, the required delivery parameters for sending the message at the target transmission reliability. This step preferably includes estimating at least one of the fragment size, the transmission rate, and a repeat count. In one embodiment, the estimating step includes estimating, from the reliability statistics 238, a message fragment length that minimizes the airtime load, i.e., total airtime required for sending the message at the target transmission reliability. For a given target transmission reliability, a trade-off exists between fragment length and repeat count. As the fragment length decreases, the efficiency of the fragment also decreases due to control overhead, which tends to increase the airtime load. However, the transmission reliability of a short fragment is higher than that of a long fragment in the same transmission environment. Thus, a shorter fragment length can reduce the number of repeats required to reach the target transmission reliability, thereby reducing the airtime load. It is therefore advantageously possible to minimize the airtime load through an enlightened selection of the fragment length, in accordance with the present invention. After the required delivery parameters have been estimated, the controller 112 controls 320 the base stations 116 to transmit the message in accordance with the required delivery parameters, thereby advantageously achieving the target transmission reliability. It will be appreciated that, when the controller 112 is controlling the base stations 116 of a plurality of geographic coverage areas, the controller 112 preferably records the delivery reliability statistics separately for each of the plurality of geographic coverage areas, so that the required delivery parameters appropriate for the geographic coverage area to which the message is being sent will be estimated and used for transmission.

To add concreteness, a simplified example of system operation in accordance with the present invention follows. Assume a single geographic coverage area and that the controller 112 has monitored delivery of two-way outbound messages long enough to have recorded a statistically meaningful set of delivery reliability statistics as a function of fragment size (excluding overhead) and transmission rate. The recorded statistics are:

| FRAGMENT SIZE | BPS | ACKs | NAKs | P |
|---|---|---|---|---|
| 50 | 3200 | 98 | 2 | 0.98 |
| 100 | 3200 | 144 | 6 | 0.96 |
| 50 | 6400 | 44 | 6 | 0.88 |
| 100 | 6400 | 75 | 25 | 0.75 |

Assume further that a one-way IS message of 1000 characters is in queue, indicating a target transmission reliability of 0.98. From the computed single-attempt successful delivery probabilities P, the controller 112 determines the delivery reliability for the message:

$$\text{RELIABILITY} = P^{N_F},$$

where $N_F$ is the number of fragments. The controller 112 then determines that a fragment size of 50 characters and a transmission rate of 3200 bps will meet the target transmission reliability of 0.98 when each fragment is repeated once. For repeated transmissions the probability of correct reception is calculated as:

$$P_R = 1 - (1-P)^{(R+1)},$$

where R is the number of repeats.

Thus, a fragment size of 100 at 3200 bps will also meet the target reliability when the fragment is repeated once, and so will a fragment size of 50 at 6400 bps, if repeated thrice. A fragment size of 100 at 6400 bps would have to be repeated four times to meet the target reliability. Let's further assume that each fragment transmitted carries an overhead of 10 additional control characters. The controller 112 computes the airtime load for the four fragment sizes:

$$\text{AIRTIME LOAD} = (L_M + O_F N_F) B_C (R+1)/S,$$

where $L_M$ is message length in characters, $O_F$ is the additional overhead per fragment in characters, $N_F$ is the number of fragments, $B_C$ is the number of bits per character, R is the number of repeats, and S is the transmission speed in bits per second. Assuming 8 bits per character, the computations yield the following airtime loads (in seconds):

| SIZE, SPEED | FRAGMENTS | REPEATS | RELIAB. | AIRTIME LOAD |
|---|---|---|---|---|
| 50, 3200 | 20 | 1 | 99.2 | 6 |
| 100, 3200 | 10 | 1 | 98.4 | 5.5 |
| 50, 6400 | 20 | 3 | 99.6 | 6 |
| 100, 6400 | 10 | 4 | 99.0 | 6.875 |

Note that a fragment size of 100 with one repeat at 3200 bps produces the lowest airtime load of 5.5 seconds, for this example.

In another embodiment of the present invention, the controller 112 records the reliability statistics 238 during a plurality of time periods, and estimates the required delivery parameters from a subset of the reliability statistics recorded during one of the plurality of time periods corresponding to a time at which the message is sent. In this manner, variation in transmission reliability as a function of time is advantageously tracked and accounted for.

Thus, it should be clear from the preceding disclosure that the present invention provides a method and apparatus in a wireless messaging system that provides an automated technique for achieving a specified message delivery reliability. Advantageously, the method and apparatus achieves its objective with a minimum of overhead, and also can minimize the airtime load.

Many modifications and variations of the present invention are possible in light of the above teachings. Thus, it is to be understood that, within the scope of the appended claims, the invention can be practiced other than as specifically described herein above.

What is claimed is:

1. A method in a wireless messaging system for estimating and using required delivery parameters to meet a target transmission reliability, the method comprising the steps of:

monitoring delivery of outbound messages to a plurality of two-way portable messaging units, said outbound messages being of a type for which an acknowledgement is expected;

recording reliability statistics for said outbound messages as a function of delivery parameters;

determining the target transmission reliability for sending a message of a type for which an acknowledgment is not expected;

estimating, from said reliability statistics, the required delivery parameters for sending said message at said target transmission reliability; and transmitting said message in accordance with the required delivery parameters.

2. The method of claim 1, wherein the estimating step comprises the step of estimating, from the reliability statistics, a message fragment length that minimizes an airtime load required for sending the message at the target transmission reliability.

3. The method of claim 1, wherein the recording step comprises the step of calculating and recording a probability that a message fragment is correctly delivered in a single delivery attempt, as a function of at least one of fragment size, transmission rate, and geographic overage area.

4. The method of claim 1, wherein the estimating step comprises the step of estimating at least one of a fragment size, a transmission rate, and a repeat count.

5. The method of claim 1, wherein the recording step comprises the step of recording the reliability statistics during a plurality of time periods, and wherein the estimating step comprises the step of estimating the required delivery parameters from a subset of the reliability statistics recorded during one of the plurality of time periods corresponding to a time at which the message is sent.

6. A controller in a wireless messaging system for estimating and using required delivery parameters to meet a target transmission reliability, the controller comprising:

a network interface for receiving messages for, transmission;

a processing system coupled to the network interface for processing the messages; and a base station interface coupled to the processing system for controlling a base station to transmit the messages, wherein the processing system is programmed to:

monitor delivery of outbound messages to a plurality of two-way portable messaging units, said outbound messages being of a type for which an acknowledgement is expected;

record reliability statistics for said outbound messages as a function of delivery parameters;

determine the target transmission reliability for sending a message of a type for which an acknowledgment is not expected;

estimate, from said reliability statistics, the required delivery parameters for sending said message at said target transmission reliability; and transmit said message in accordance with the required delivery parameters.

7. The controller of claim 6, wherein the processing system is further programmed to estimate, from the reliability statistics, a message fragment length that minimizes an airtime load required for sending the message at the target transmission reliability.

8. The controller of claim 6, wherein the processing system is further programmed to calculate and record a probability that a message fragment is correctly delivered in a single delivery attempt, as a function of at least one of fragment size, transmission rate, and geographic coverage area.

9. The controller of claim 6, wherein the processing system is further programmed to estimate at least one of a fragment size, a transmission rate, and a repeat count.

10. The controller of claim 6, wherein the processing system is further programmed to:

record the reliability statistics during a plurality of time periods; and estimate the required delivery parameters from a subset of the reliability statistics recorded during one of the plurality of time periods corresponding to a time at which the message is sent.

* * * * *